United States Patent
Vedula et al.

(10) Patent No.: US 9,638,164 B2
(45) Date of Patent: May 2, 2017

(54) CHORD EXTENDERS FOR A WIND TURBINE ROTOR BLADE ASSEMBLY

(71) Applicant: General Electric Company, Schenectady, NY (US)

(72) Inventors: Ramesh Vedula, Bangalore (IN); Kunal Upendra Sakekar, Sangli (IN); Jonathan Glenn Luedke, Simpsonville, SC (US); Stefan Herr, Greenville, SC (US); Scott Gabell Riddell, Greer, SC (US); Michael Christopher Booth, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 343 days.

(21) Appl. No.: 14/472,488

(22) Filed: Aug. 29, 2014

(65) Prior Publication Data
US 2015/0118058 A1   Apr. 30, 2015

(30) Foreign Application Priority Data
Oct. 31, 2013   (IN) .......................... 4913/CHE/2013

(51) Int. Cl.
F03D 1/06 (2006.01)

(52) U.S. Cl.
CPC ......... F03D 1/0658 (2013.01); F03D 1/0633 (2013.01); F03D 1/0675 (2013.01);
(Continued)

(58) Field of Classification Search
CPC .... F03D 1/0658; F03D 1/0657; F03D 1/0633; Y02E 10/721; F05B 2240/30; F05B 2240/301
(Continued)

(56) References Cited

U.S. PATENT DOCUMENTS 5,088,665 A * 2/1992 Vijgen .................. B64C 23/06
                                                        244/198
5,533,865 A   7/1996 Dassen et al.
(Continued)

FOREIGN PATENT DOCUMENTS

CN          202023688 U       11/2011
DE    102010026588 A1 *   1/2012  ........... F03D 1/0641
(Continued)

OTHER PUBLICATIONS

European Search Report and Opinion issued in connection with corresponding EP Application No. 14190127.2 on Feb. 26, 2015.

Primary Examiner — Marina Tietjen
(74) Attorney, Agent, or Firm — Dority & Manning, P.A.

(57) ABSTRACT

In one aspect, a rotor blade assembly for a wind turbine may generally include a rotor blade extending lengthwise between a root and a tip. The rotor blade may include a pressure side and a suction side extending between a leading edge and a trailing edge. Additionally, the rotor blade assembly may include a chord extender having an attachment portion coupled to at least of the pressure side or the suction side and an extension portion extending outwardly from the attachment portion beyond the trailing edge. The extension portion may extend chordwise between a first end disposed adjacent to the trailing edge and a second end disposed opposite the first end. The extension portion may include a surface defined between the first and second ends. The extension portion may further include at least one stiffening rib projecting outwardly from the surface.

20 Claims, 9 Drawing Sheets

(52) U.S. Cl.
CPC ..... *F05B 2240/30* (2013.01); *F05B 2240/301* (2013.01); *Y02E 10/721* (2013.01)

(58) Field of Classification Search
USPC .............. 416/236 R, 62, 228, 235; 415/119; 244/200.1, 215
See application file for complete search history.

(56) References Cited

U.S. PATENT DOCUMENTS

| | | | |
|---|---|---|---|
| 6,966,758 | B2 | 11/2005 | Grabau et al. |
| 7,293,959 | B2 | 11/2007 | Pedersen et al. |
| 7,458,777 | B2 | 12/2008 | Herr |
| 7,976,276 | B2 | 7/2011 | Riddell et al. |
| 8,113,788 | B2 | 2/2012 | Stiesdal |
| 8,267,657 | B2 | 9/2012 | Huck et al. |
| 8,317,479 | B2 | 11/2012 | Vronsky et al. |
| 8,414,261 | B2 | 4/2013 | Bonnet |
| 8,430,638 | B2 | 4/2013 | Drobietz et al. |
| 2007/0077150 | A1 | 4/2007 | Llorente Gonzalez |
| 2008/0166241 | A1 | 7/2008 | Herr et al. |
| 2010/0047070 | A1 | 2/2010 | Slot et al. |
| 2010/0143151 | A1 | 6/2010 | Kinzie et al. |
| 2011/0018282 | A1 | 1/2011 | Hayashi et al. |
| 2011/0142665 | A1 | 6/2011 | Huck |
| 2012/0057984 | A1 | 3/2012 | Fuglsang et al. |
| 2012/0057987 | A1 | 3/2012 | Fuglsang et al. |
| 2012/0063910 | A1 | 3/2012 | Fuglsang et al. |
| 2012/0063913 | A1 | 3/2012 | Fugslang et al. |
| 2012/0070281 | A1 | 3/2012 | Fuglsang et al. |
| 2012/0070299 | A1 | 3/2012 | Fuglsang et al. |
| 2012/0134817 | A1 | 5/2012 | Bagepalli et al. |
| 2012/0141269 | A1 | 6/2012 | Giguere et al. |
| 2012/0257978 | A1 | 10/2012 | Jensen et al. |
| 2012/0269640 | A1 | 10/2012 | Enevoldsen et al. |
| 2012/0269644 | A1 | 10/2012 | Enevoldsen et al. |
| 2013/0129519 | A1 | 5/2013 | Nielsen et al. |

FOREIGN PATENT DOCUMENTS

| | | |
|---|---|---|
| DK | 199500009 U3 | 5/1996 |
| EP | 1112928 A2 | 7/2001 |
| JP | H 0232000 A | 2/1990 |
| WO | WO 95/19500 | 7/1995 |
| WO | WO 2008/035149 A2 | 3/2008 |
| WO | WO 2009/146810 A2 | 12/2009 |
| WO | WO 2010/100237 A2 | 9/2010 |
| WO | WO 2011/157849 A2 | 12/2011 |
| WO | WO 2012/071679 A1 | 6/2012 |
| WO | WO 2013/045601 A1 | 4/2013 |
| WO | 2014044412 A1 | 3/2014 |

\* cited by examiner

CHORD EXTENDERS FOR A WIND TURBINE ROTOR BLADE ASSEMBLY

FIELD OF THE INVENTION

The present subject matter relates generally to wind turbines and, more particularly, to a chord extender for a wind turbine rotor blade assembly.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The particular size of wind turbine rotor blades is a significant factor contributing to the overall efficiency of the wind turbine. Specifically, increases in the width or chord of a rotor blade may generally lead to an overall increase in the energy production of a wind turbine. For example, an increased chord length may result in an increased lift-to-drag ratio for a rotor blade, thereby increasing the corresponding rotor torque and, thus, the power production for the wind turbine. However, rotor blades are often subject to design constraints that serve to limit the overall size of each blade, particularly during manufacturing and/or transporting of the rotor blades. Accordingly, it would be desirable to provide a means for increasing the effective chord length of the rotor blade to improve its performance while observing manufacturing and transportation-related design constraints.

Moreover, as a wind turbine is operated over time, surface fouling may cause the performance of the rotor blades to be degraded. Specifically, as the outer surface of a rotor blade becomes roughened, the aerodynamic performance of the rotor blade is decreased significantly. In such instance, it would be desirable to provide a means for increasing the performance of the rotor blade despite its roughened surfaces.

Accordingly, a chord extender that may be separately attached onto a new or existing rotor blade would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade assembly for a wind turbine. The rotor blade assembly may generally include a rotor blade extending lengthwise between a root and a tip. The rotor blade may include a pressure side and a suction side extending between a leading edge and a trailing edge. Additionally, the rotor blade assembly may include a chord extender having an attachment portion coupled to at least of the pressure side or the suction side and an extension portion extending outwardly from the attachment portion beyond the trailing edge. The extension portion may extend chordwise between a first end disposed adjacent to the trailing edge and a second end disposed opposite the first end. The extension portion may include a surface defined between the first and second ends. The extension portion may further include at least one stiffening rib projecting outwardly from the surface.

In a further aspect, the present subject matter is directed to a chord extender for a rotor blade of a wind turbine. The chord extender may generally include an attachment portion configured to be coupled to an outer surface defined by at least of a pressure side or a suction side of the rotor blade and an extension portion configured to extend outwardly from the attachment portion beyond a trailing edge of the rotor blade. The extension portion may extend chordwise between a first end configured to be disposed adjacent to the trailing edge and a second end disposed opposite the first end. The extension portion may include a surface defined between the first and second ends. Additionally, the chord extender may include at least one stiffening rib projecting outwardly from the surface of the extension portion. The stiffening rib(s) may extend lengthwise along the surface between a first rib end and a second rib end. The first rib end may be configured to be disposed adjacent to the trailing edge.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to chord extenders for wind turbine rotor blades. Specifically, in several embodiments, a chord extender is disclosed that may be installed onto a rotor blade at its trailing edge so as to serve as an extension or elongation of the blade's chord length. Such an extension of the blade's effective chord length may generally enhance the operational efficiency of the rotor blade, such as by increasing the lift-to-drag ratio and/or the axial induction of the rotor blade. In several embodiments, one or more design characteristics of the chord extender (e.g., the shape, the chordwise length, the angle of orientation, etc.) may be varied in order to enhance the operational impact of the extender. For example, in a particular embodiment, the chordwise length of the chord extender may be varied depending on the spanwise location at which the extender is installed along the rotor blade, such as by reducing the chordwise length as the chord extender is installed at locations further outboard.

Additionally, as will be described below, the disclosed chord extender may include one or more stiffening ribs projecting outwardly from one or more of its surfaces. In general, the stiffening ribs may be configured to provide additional stiffness and rigidity to the chord extender, thereby allowing to chord extender to withstand the aerodynamic loading occurring across the rotor blade during operation of the wind turbine. Moreover, the stiffening rib(s) may also be configured to be directly and/or directly engaged against the trailing edge of the rotor blade, thereby allowing a reactive load to be generated between the trailing edge and the rib(s) to counter the aerodynamic loads acting on the chord extender.

Figure 1:
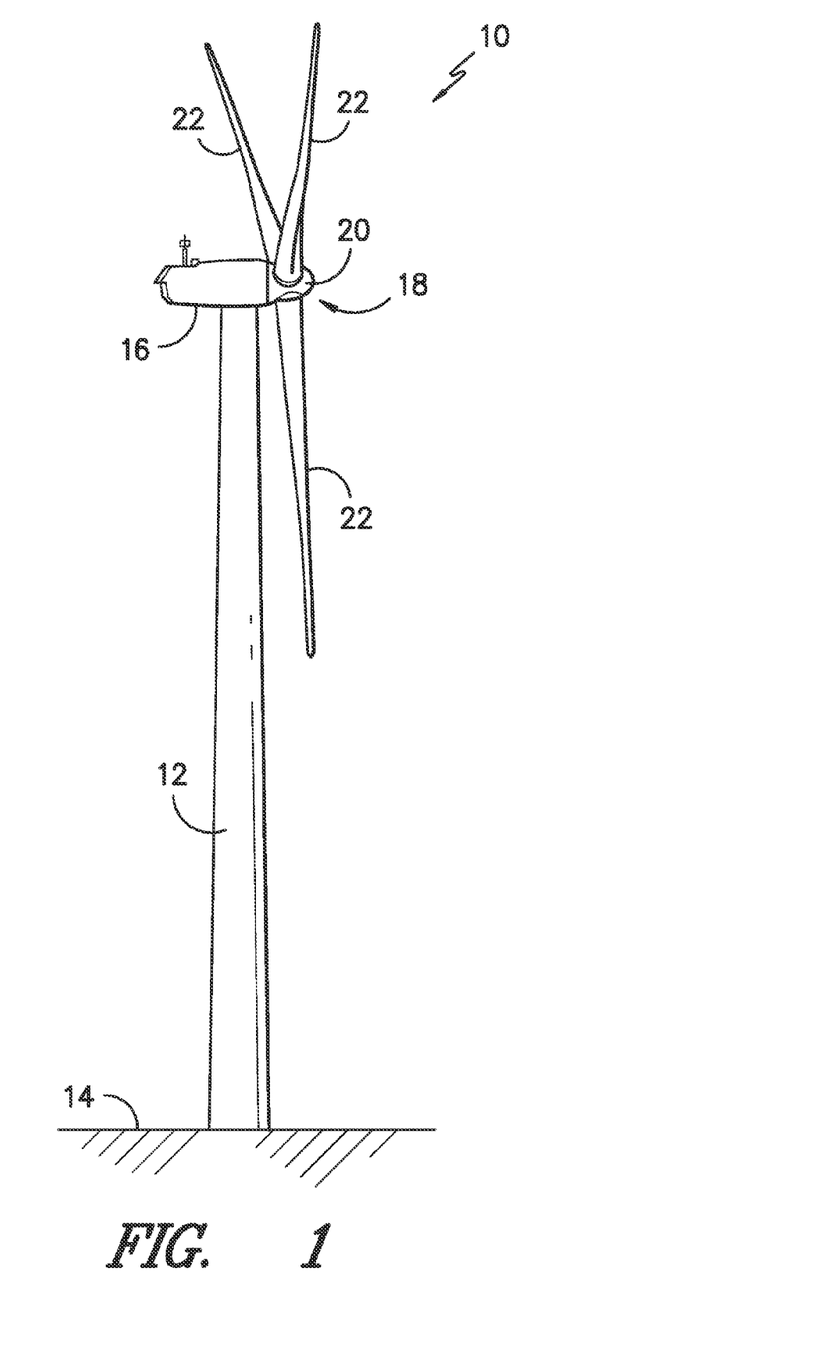
FIG. 1 illustrates a perspective view of one embodiment of a wind turbine.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in alternative embodiments, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
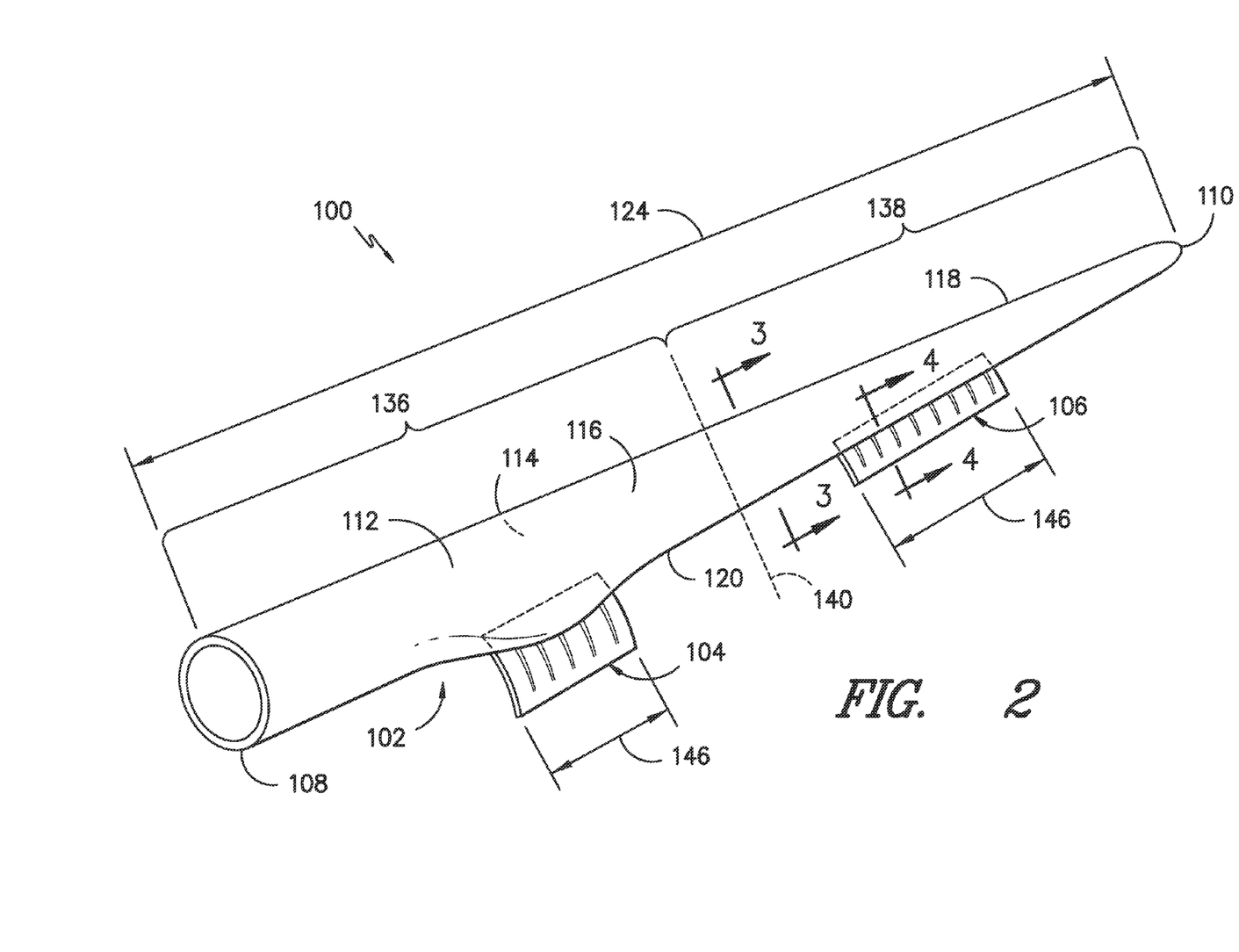
FIG. 2 illustrates a perspective view of one embodiment of a rotor blade assembly in accordance with aspects of the present subject matter.
Figure 3:
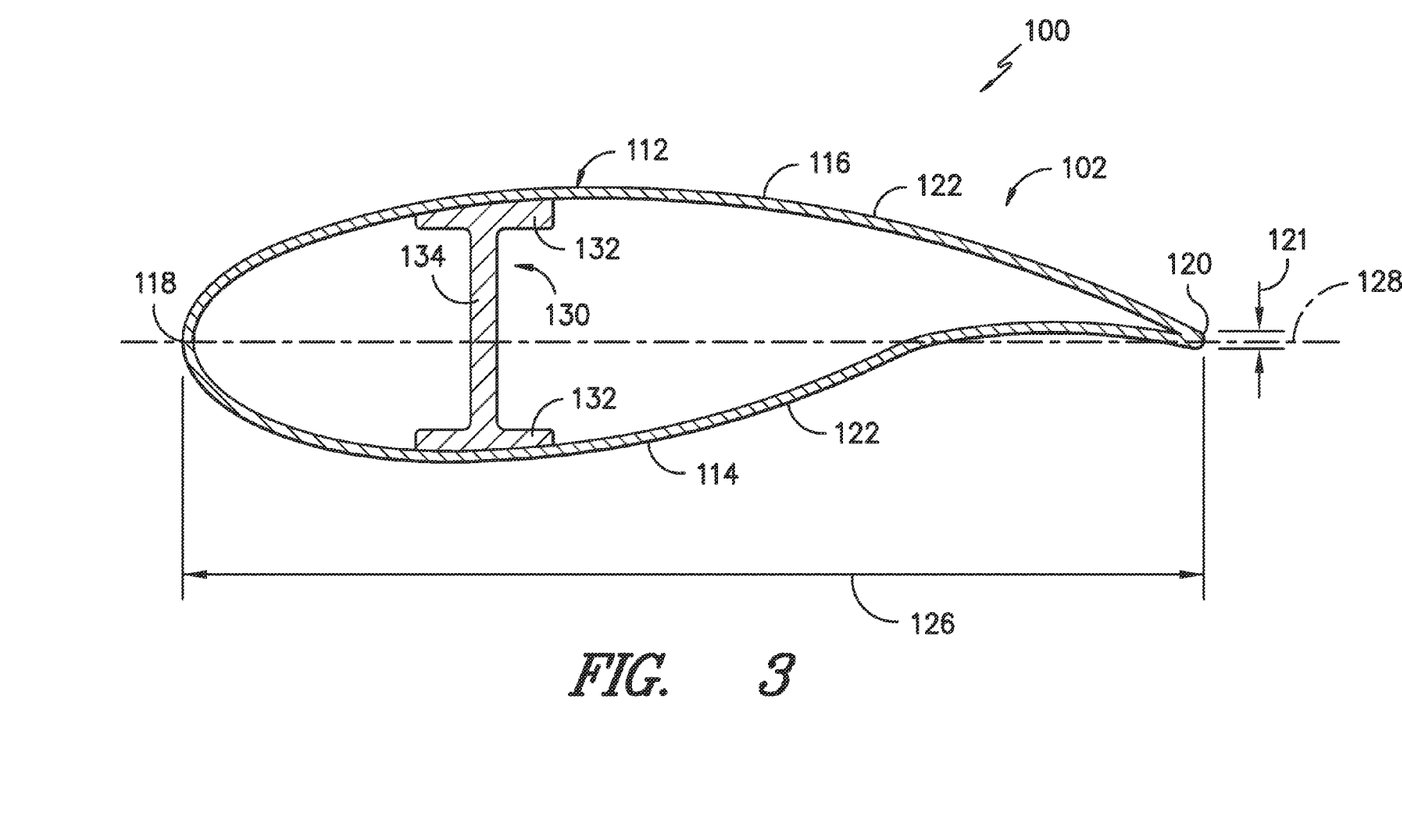
FIG. 3 illustrates a cross-sectional view of the rotor blade assembly shown in FIG. 2 taken about line 3-3, particularly illustrating the cross-section of a rotor blade of the rotor blade assembly.
Figure 4:
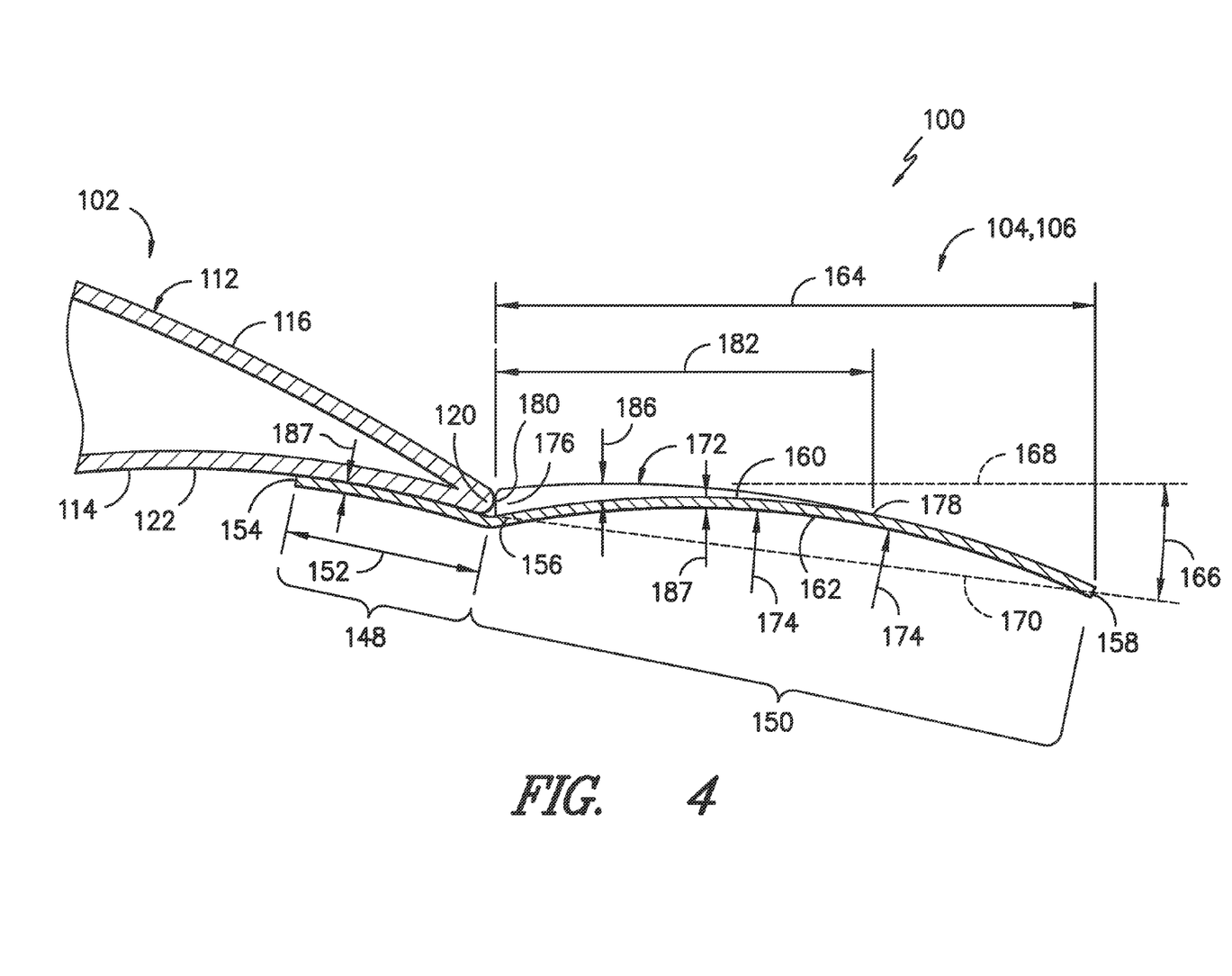
FIG. 4 illustrates a cross-sectional view of the rotor blade assembly shown in FIG. 2 taken about line 4-4, particularly illustrating a chord extender of the rotor blade assembly coupled to the rotor blade shown in FIG. 2 at its trailing edge.
Figure 5:
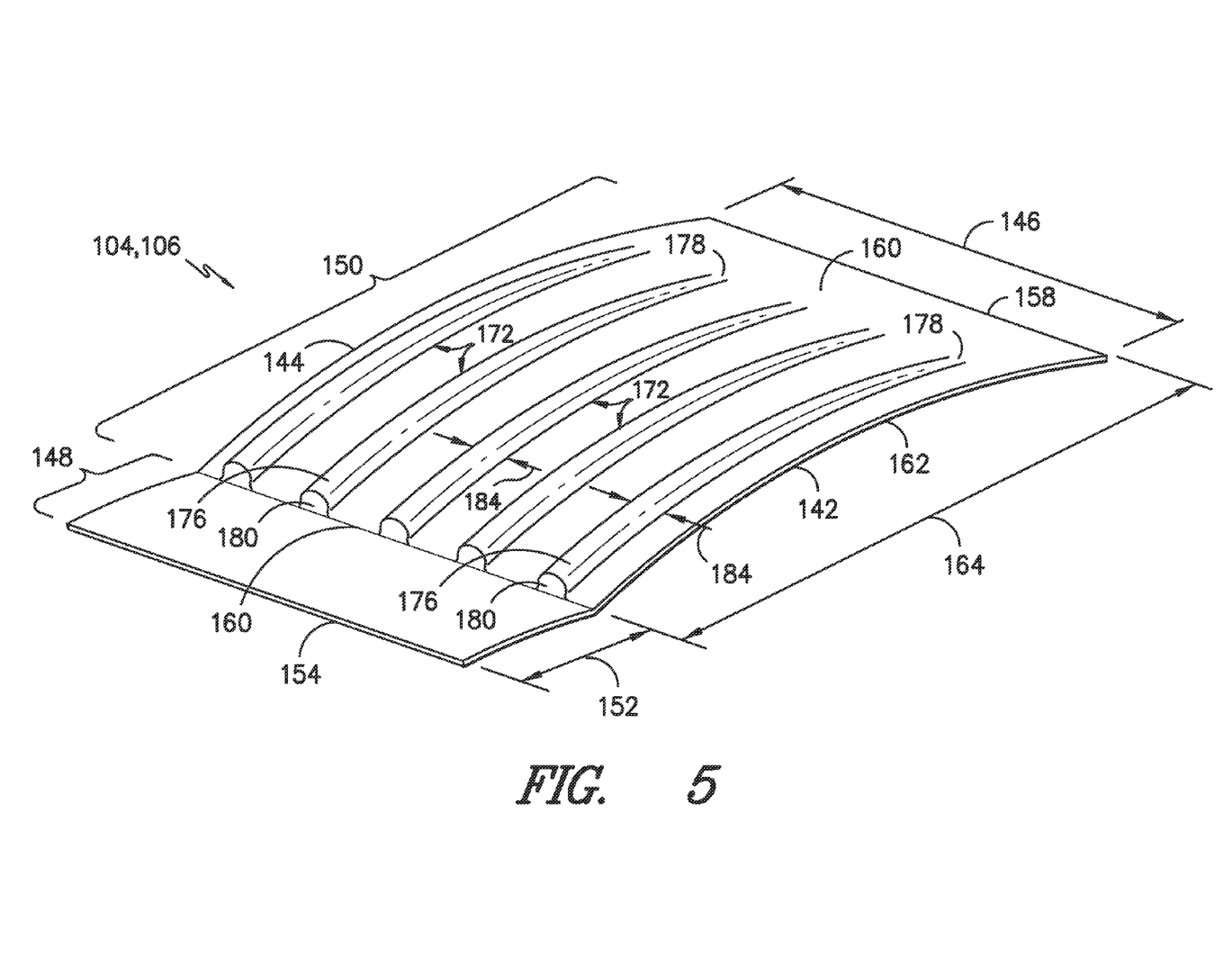
FIG. 5 illustrates a perspective view of the chord extender shown in FIG. 4.

Referring now to FIGS. 2-5, one embodiment of a rotor blade assembly 100 is illustrated in accordance with aspects of the present subject matter. Specifically, FIG. 2 illustrates a perspective view of the rotor blade assembly 100, particularly illustrating a rotor blade 102 and a chord extender(s) 104, 106 of the assembly 100. FIGS. 3 and 4 illustrate cross-sectional views of the rotor blade assembly 100 shown in FIG. 2 taken about lines 3-3 and 4-4, respectively. Additionally, FIG. 5 illustrates a perspective view of one of the chord extenders 104, 106 shown in FIG. 2.

In general, the rotor blade assembly 100 may include a rotor blade 102 (e.g., rotor blade 22 from FIG. 1) and one or more chord extenders 104, 106 coupled to and extending outwardly from the rotor blade 22. As will be described below, the chord extender(s) 104, 106 may generally be configured to enhance the energy capturing capabilities of the rotor blade 102. For example, each chord extender 104, 106 may provide for an effective increase in the chord length of the rotor blade 102 at the spanwise location at which the extender 104, 106 is installed, thereby increasing lift and axial induction of the rotor blade 102. Moreover, such an increased effective chord length may also increase the lift-to-drag ratio of the rotor blade 102, resulting in increased rotor torque and, thus, increased power-extraction for the wind turbine 10. Accordingly, by installing one or more of the disclosed chord extenders 104, 106 onto a rotor blade 102, the annual energy production (AEP) of the corresponding wind turbine 10 may be significantly improved.

As shown in the illustrated embodiment, the rotor blade 102 of the rotor blade assembly 100 may generally include a blade root 108 configured to be mounted or otherwise secured to the hub 20 (FIG. 1) of a wind turbine 10 and a blade tip 110 disposed opposite the blade root 108. A body 112 of the rotor blade 102 generally extends lengthwise between the blade root 108 and the blade tip 110. The body 112 may serve as the outer casing/covering of the rotor blade 102.

Additionally, the body 112 of the rotor blade 102 may generally be configured to define an aerodynamic profile. For example, in several embodiments, the body 112 may define an airfoil shaped cross-section, such as a symmetrical or cambered airfoil shaped cross-section. Thus, as shown in FIGS. 2 and 3, the body 112 may define a pressure side 114 and a suction side 116 extending between leading and trailing edges 118, 120. Moreover, an outer surface 122 of the rotor blade 102 may generally be defined around it outer perimeter along the pressure and suction sides 114, 116.

Further, the rotor blade 102 may also have a span 124 defining the total length of the blade 102 between the blade root 108 and the blade tip 110 and a chord 126 defining the length of the blade 102 between the leading and trailing edges 118, 120 at each radial station along the span 124 (e.g., measured along dashed chord line 128 (FIG. 3)). As is generally understood, the chord 126 may generally vary in length with respect to the span 124 as the rotor blade 102 extends from the blade root 108 to the blade tip 110.

Moreover, as particularly shown in FIG. 3, the rotor blade 102 may include at least one substantially rigid spar member 130 configured to provide increased stiffness and rigidity to the rotor blade 102. For example, in several embodiments, the spar member 130 may include a pair of longitudinally extending spar caps 132 configured to be engaged against opposing inner surfaces of the pressure and suction sides 114, 116 of the blade 102. The spar member 130 may also include one or more shear webs 134 configured to extend between the opposed spar caps 132.

As indicated above, the rotor blade assembly 100 may also include one or more chord extenders 104, 106 installed onto the rotor blade 102. For example, as shown in FIG. 2, the rotor blade assembly 100 includes two chord extenders installed thereon (e.g., a first chord extender 104 and a second chord extender 106). However, in other embodiments, the rotor blade 102 may include a single chord extender or three or more chord extenders installed thereon.

Each chord extender 104, 106 may generally be configured to be installed at any suitable location along the span 124 of the rotor blade 102. For example, as shown in FIG. 2, the first chord extender 104 is installed along an inboard portion 136 of the rotor blade 102 (e.g., at or adjacent to the location at which the rotor blade 102 transitions from a cylindrical cross-sectional shape to an aerodynamic cross-sectional shape) while the second chord extender 106 is installed along an outboard portion 138 of the rotor blade 102.

In several embodiments, the inboard portion 136 of the rotor blade 102 may correspond to a spanwise section of the blade 102 extending from the blade root 108 to a given spanwise location 140 defined on the blade 102 and the outboard portion may correspond to a spanwise section of the blade 102 extending from the spanwise location 140 to the blade tip 110. In such embodiments, the spanwise location may, for example, be defined at a distance from the blade root 108 ranging from about 30% to about 70% of the span 124 of the rotor blade 102, such as from about 40% to about 60% of the span 124 or from about 45% to about 55% of the span 124 and any other subranges therebetween.

As shown in FIG. 5, each chord extender 104, 106 may generally be configured to extend spanwise between an inboard edge 144 and an outboard edge 146 and may generally define any suitable spanwise length 148 between its inboard and outboard edges 144, 146. For example, as shown in FIG. 2, the spanwise length 146 of the chord extenders 104, 106 generally corresponds to a small portion of the overall span 124 of the blade 102, such as a length less than 10% of the span 124. However, in other embodiments, the spanwise length 146 may corresponds to a larger portion of the overall span 124 of the blade 102, such as a length greater than 10% of the span 124.

Additionally, as shown in FIGS. 4 and 5, each chord extender 104, 106 may include an attachment portion 148 configured to be coupled to the outer surface 122 of the rotor blade 102 adjacent to the trailing edge 120 and an extension portion 150 extending outwardly from the attachment portion 148 beyond the trailing edge 120 so as to provide an increase in the effective chord length of the rotor blade 102. In general, the attachment portion 148 of each chord extender 104, 106 may be configured to be coupled to the outer surface 122 defined by at least one of the pressure side 114 or the suction side 116 of the rotor blade 102. For example, as shown in the illustrated embodiment, the attachment portion 148 is configured to be coupled to the outer surface 122 along the pressure side 114. However, in another embodiment, the attachment portion 148 may be configured to be coupled to the outer surface 122 along the suction side 116 of the rotor blade 102. Moreover, as will be described below with reference to FIGS. 8 and 9, in a further embodiment, the attachment portion 148 may be configured to be coupled to the rotor blade 102 along both the pressure and suction sides 114, 116.

It should be appreciated that the attachment portion 148 of each chord extender 104, 106 may generally be configured to be coupled to the rotor blade 102 along its pressure and/or suction side 114, 116 using any suitable attachment means known in the art. For example, in one embodiment, a layer of adhesive foam tape, double-sided tape or any other suitable adhesive may be positioned between the attachment portion 148 and the outer surface 122 of the rotor blade 102 to allow the chord extender 104, 106 to be coupled to the blade 102. In another embodiment, the attachment portion 148 may be coupled to the rotor blade 122 using suitable mechanical fasteners or any other suitable attachment means.

It should also be appreciated that the attachment portion 148 may generally be configured to be coupled to the outer surface 122 of the rotor blade 102 along any suitable attachment length 152 extending between an inner edge 154 of the chord extender 104, 106 and the trailing edge 120 of the rotor blade 102. Such length 152 may generally be varied depending on numerous factors, including, for example, the exact configuration of the chord extender 104, 106 as well as the aerodynamic loads acting on the extension portion 150 of the extender 104, 106.

Referring still to FIGS. 4 and 5, the extension portion 150 of each chord extender 104, 106 may generally be configured to extend chordwise between a first end 156 disposed adjacent to the trailing edge 120 of the rotor blade 102 and a second end 158 disposed opposite the first end 156. Additionally, the extension portion 150 may define both an upper surface 160 and a lower surface 162 extending between the first and second ends 156, 158. As shown, the upper surface 160 is generally defined along the extension portion 150 so as to face the same general direction as the suction side 116 of rotor blade 102 while the lower surface 162 is generally defined along the extension portion 150 so as to face the same generation direction as the pressure side 114 of the blade 102.

Figure 6:
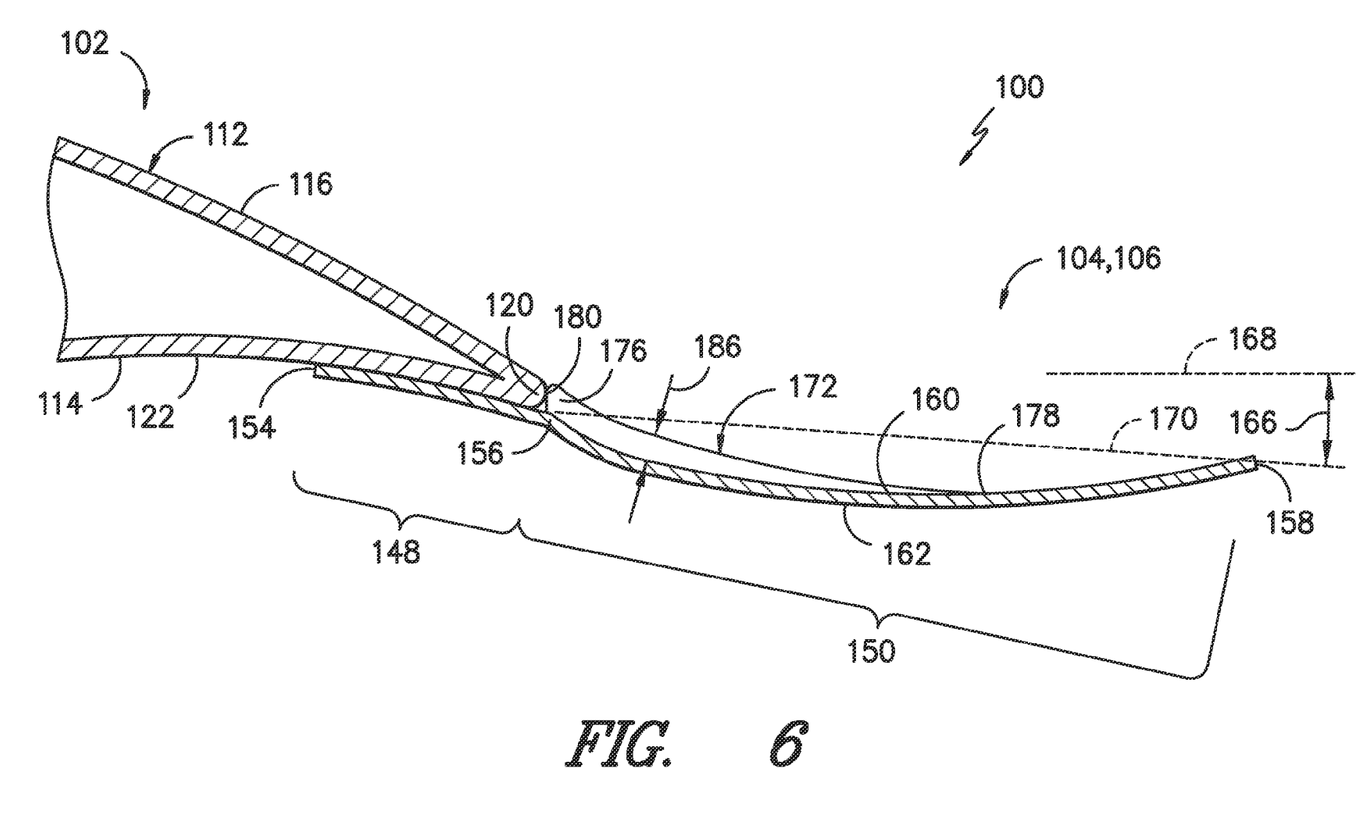
FIG. 6 illustrates a cross-sectional view of another embodiment of a chord extender coupled to the rotor blade shown in FIG. 2 at its trailing edge.
Figure 7:
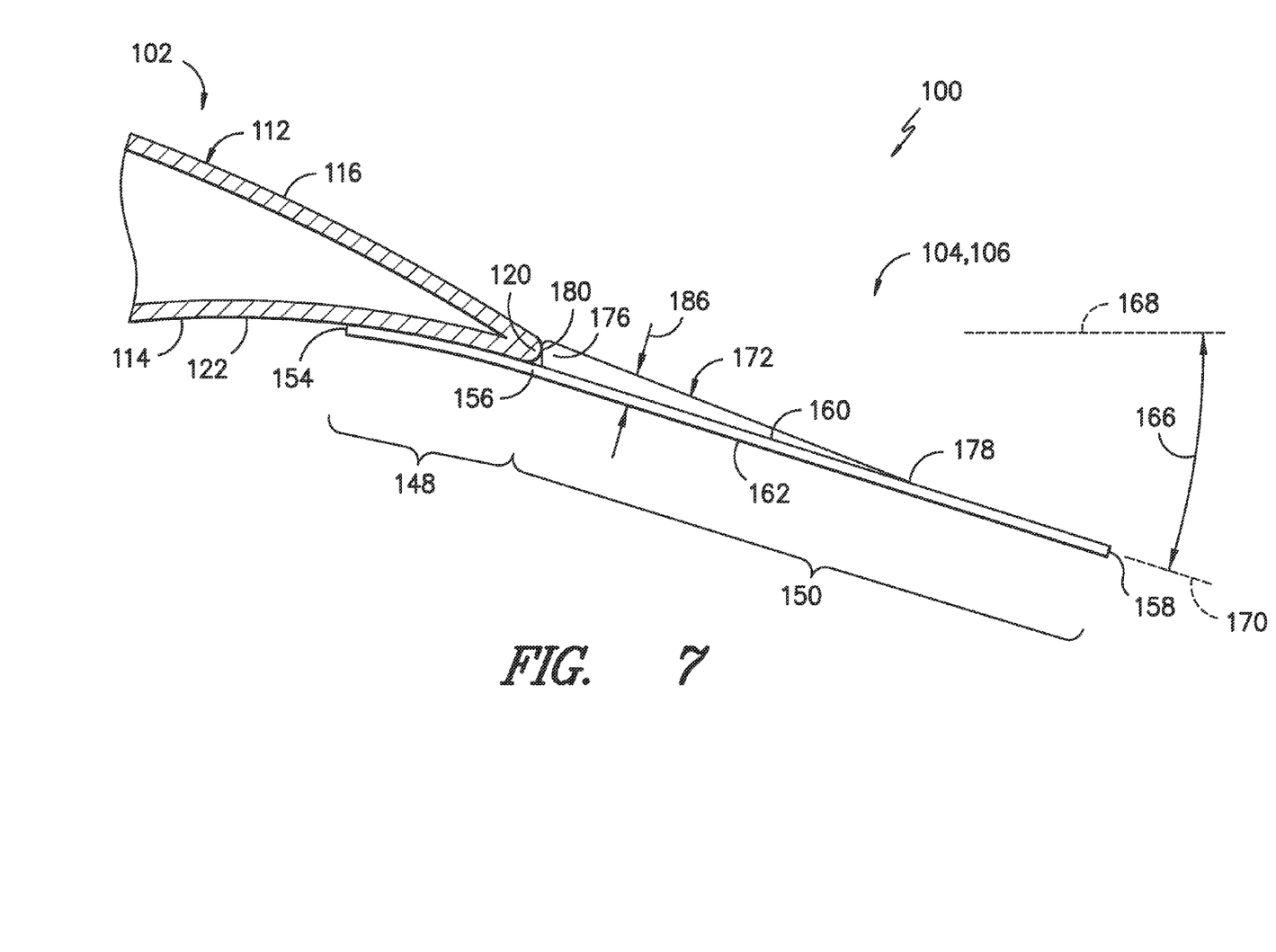
FIG. 7 illustrates a cross-sectional view of a further embodiment of a chord extender coupled to the rotor blade shown in FIG. 2 at its trailing edge.

In general, the extension portion 150 may be configured to define any suitable shape or profile between its first and second ends 156, 158. For example, in several embodiments, the extension portion may be configured to define a curved profile between the first and second ends 156, 158. Specifically, as shown in FIG. 4, the extension portion 150 is curved such that its lower surface 162 defines a concave profile between the first and second ends 156, 158. However, in alternative embodiments, the extension portion 150 may be configured define any other suitable curved profile. For instance, as shown in the alternative embodiment of FIG. 6, the extension portion 150 is curved such that its lower surface 162 defines a convex profile between the first and second ends 156, 158. Alternatively, the extension portion 150 may be configured to define a straight profile between its first and second ends 156, 158. For example, as shown in the further embodiment of FIG. 7, the extension portion 150 extends between its first and second ends 156, 158 along a straight line.

Additionally, it should be appreciated that the extension portion 150 may generally be configured to define any suitable chordwise length 164 between its first and second ends 156, 158. However, in several embodiments, the chordwise length may generally range from about 5% of the local chord 126 of the rotor blade 102 at the spanwise location of the chord extender 104, 106 to about 20% of the local chord 126, such as from about 5% to about 15% of the local chord 126 or from about 10% to about 20% of the local chord 126 and any other subranges therebetween.

Moreover, in several embodiments of the present subject matter, the chordwise length 164 of the extension portion 150 may be varied depending upon the spanwise location at which the chord extender 104, 106 is installed along the rotor blade 102. For instance, in a particular embodiment, the percentage of the local chord 126 corresponding to the chordwise length 164 may be decreased as each chord extender 104, 106 is installed further outboard along the span 124 of the rotor blade 102. In such an embodiment, referring back to FIG. 2, the first chord extender 104 may be configured to define a chordwise length 164 as a percentage of the local chord 126 at its inboard spanwise location that is greater than the chordwise length 164 defined by second chord extender 106 as a percentage of the local chord 126 at its outboard spanwise location. For example, the first chord extender 104 may be configured to define a chordwise length 164 ranging from about 10% to about 20% of the corresponding local chord 126 while the second chord extender 106 may be configured to define a chordwise length 126 ranging from about 5% to about 15% of the corresponding local chord 126.

Additionally, in several embodiments, the extension portion 150 of each chord extender 104, 106 may be oriented at an angle relative to a reference chord line 168 extending parallel to the chord line 142 (FIG. 2) of the rotor blade 102. As shown in FIG. 4 (as well as in FIGS. 6 and 7), the angle 166 may be defined between the reference chord line 168 and a straight reference line 170 extending directly between the first and second ends 156, 158 of the extension portion 150. In one embodiment, the angle 166 may generally range from about 5 degrees to about 30 degrees, such as from about 10 degrees to about 25 degrees or from about 15 degrees to about 25 degrees and any other subranges therebetween. It should be appreciated that, in the illustrated embodiment, the extension portion 150 is angled from the trailing edge 120 in the direction of the pressure side 114 of the rotor blade 102. However, in another embodiment, the extension portion 150 may be angled from the trailing edge 120 in the direction of the suction side 116 of the rotor blade 102.

Further, in several embodiments, each chord extender 104, 106 may include one or more stiffening ribs 172 projecting outwardly from the extension portion 150. In general, the stiffening rib(s) 172 may be configured to provide additional stiffness and rigidity to the chord extender 104, 106. Specifically, as the chord extender 104, 106 is subjected to aerodynamic loading while the rotor blade assembly 100 is being rotated during operation of the wind turbine 10, the extension portion 150 may tend to bow or flex in the direction of the suction side 116 of the blade 102 due to the aerodynamic loads (indicated by arrows 174 in FIG. 4) applied against its lower surface 162. Thus, by providing the stiffening rib(s) 172 along at least a portion of the chordwise length 164 of the chord extender 104, 106, the ribs 172 may serve to reduce the bowing or flexing occurring when the extension portion 150 is subjected to aerodynamic loading.

As shown in FIG. 5, in one embodiment, the chord extender 104, 106 includes a plurality of stiffening ribs 172 projecting outwardly from the upper surface 160 of the extension portion 150. However, in another embodiment, the stiffening ribs 172 may be configured to project outwardly from the bottom surface 172 of the extension portion 150. It should be appreciated that, although the chord extender 104, 106 shown in FIG. 5 is shown as including a specific number of stiffening ribs 172 having a given spacing defined between each pair of adjacent ribs 172, the chord extender 104, 106 may generally include any suitable number of stiffening ribs 172 having any suitable spacing relative to one another along the spanwise length 140 of the chord extender 104, 106. For example, as will be described below with reference to FIGS. 8 and 9, each chord extender 104, 106 may simply include a single rib 172 projecting outwardly from a surface of the extension portion 150.

Additionally, as shown in the illustrated embodiment, each stiffening rib 172 may generally be configured to extend chordwise along the upper surface 160 of the extension portion 150 between a first rib end 176 and a second rib end 178. In several embodiments, an end face 180 defined at the first rib end 176 may be configured to be disposed directly adjacent to and/or in contact with the trailing edge 120 of the rotor blade 102. As such, the ribs 172 may be configured to serve as mechanical stops for the chord extender 104, 106 against the rotor blade 102. Specifically, as aerodynamic loads 174 push the extension portion 150 in the direction of the suction side 116 of the rotor blade 102, the end face 180 of the first rib end 176 may be configured to contact or otherwise be engaged against the trailing edge 120, thereby limiting further movement of the extension portion 150 and providing a reactive load to counter the aerodynamic loads 174.

It should be appreciated that, in one embodiment, the end face 180 of the first rib end 176 may configured to define a shape or profile that generally conforms to the shape or profile of the trailing edge 120. Alternatively, the end face 180 may be configured to define any suitable shape or profile, regardless of the shape or profile of the trialing edge 120.

Additionally, each stiffening rib 172 may be configured to define a chordwise rib length 182 (FIG. 4) between its first and second ends 176, 178 and a spanwise rib width 184 (FIG. 5) extending transverse to the rib length 182. As shown in the illustrated embodiment, each stiffening rib 172 may be configured such that its chordwise rib length 182 is greater than its spanwise rib width 184. However, as will be described below with reference to FIGS. 8 and 9, in alternative embodiment, each stiffening rib 172 may be configured such that its chordwise rib length 182 is less than its spanwise rib width 184. For example, in one embodiment, instead of being oriented lengthwise in the chordwise direction, one or more of the stiffening ribs 172 may be oriented lengthwise in the spanwise direction.

Moreover, as particularly shown in FIG. 4, each stiffening rib 172 may be configured to define a height 186 above the upper surface 160 of the extension portion 150. In several embodiments, the height 186 may be tapered as each rib 172 extends lengthwise between its first and second ends 176, 178. For example, as shown in the illustrated embodiment, the height 186 is continuously decreased from the first end 176 to the second end 178 of each rib 172. As such, the maximum height of each stiffening rib 172 may generally be located at its first end 176, thereby enhancing the ability of each rib 172 to serve as a mechanical stop against the trailing edge 120 of the rotor blade 102.

It should be appreciated that, in several embodiments, the maximum height 186 of each rib 172 may be less than or equal to a height 121 (FIG. 3) of the rotor blade 102 at the trailing edge 120. For example, as shown in the illustrated embodiment, each rib 172 defines a maximum height 186 that is substantially equal to the height 121 of the trailing edge 120. Alternatively, the maximum height 186 of each rib 172 may be greater than the height 121 of the trailing edge 120.

It should also be appreciated that the attachment and extension portions 148, 150 of each chord extender 104, 106 may also define a thickness or height 187 (FIG. 4). In several embodiments, the height 187 may be constant along both the attachment and extension portions 148, 150. Alternatively, the height 187 may be varied at one or more locations along the attachment portion 148 and/or the extension portion 150. Additionally, in one embodiment, the ratio of the maximum height 186 of each rib 172 to the height 187 of the attachment and/or extension portions 148, 150 may range from 100:1 to about 1:1, such as from about 50:1 to about 1:1 or from 10:1 to about 2:1 and any other subranges therebetween.

Figure 8:
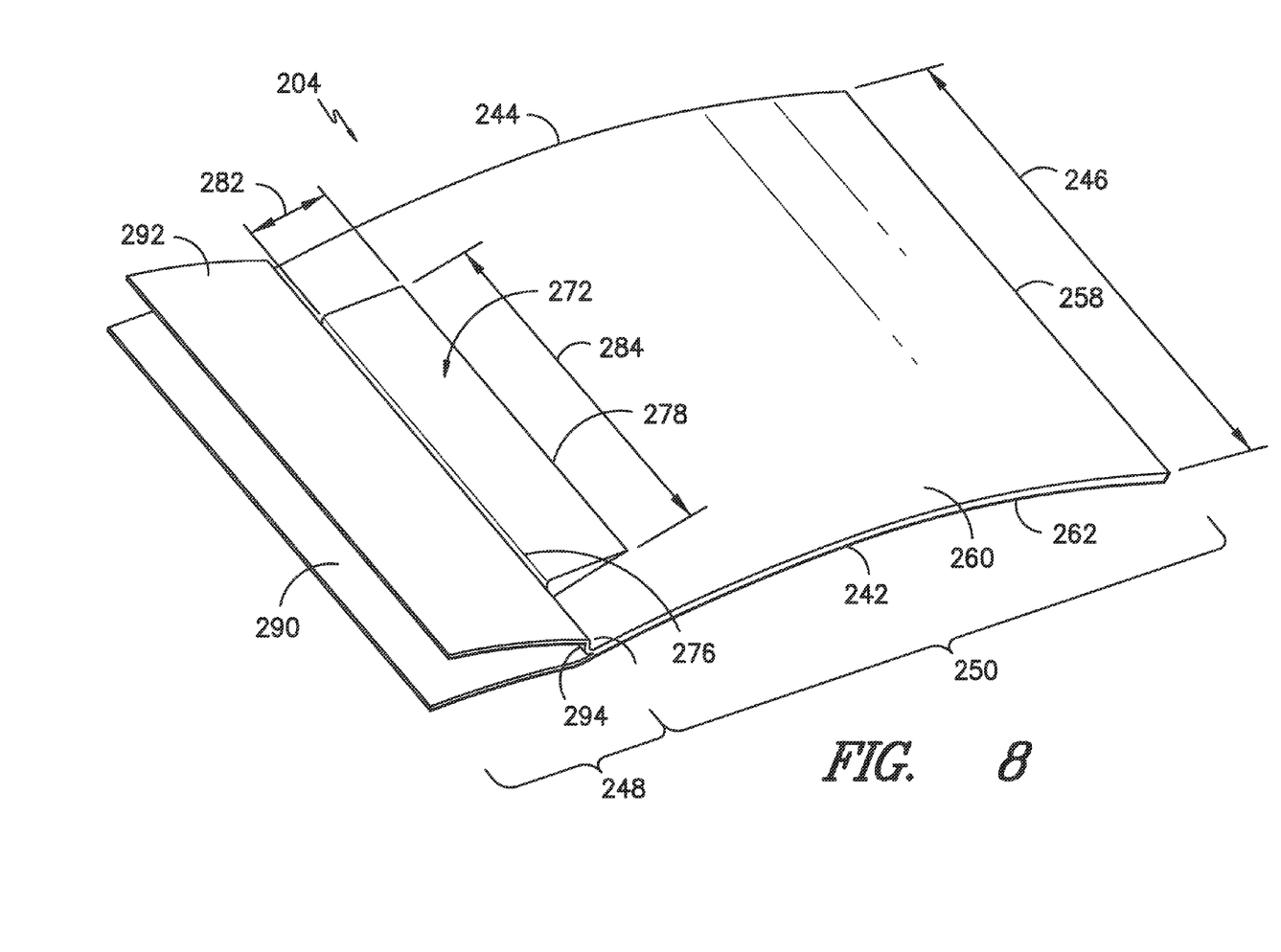
FIG. 8 illustrates a perspective view of yet another embodiment of a chord extender in accordance with aspects of the present subject matter.
Figure 9:
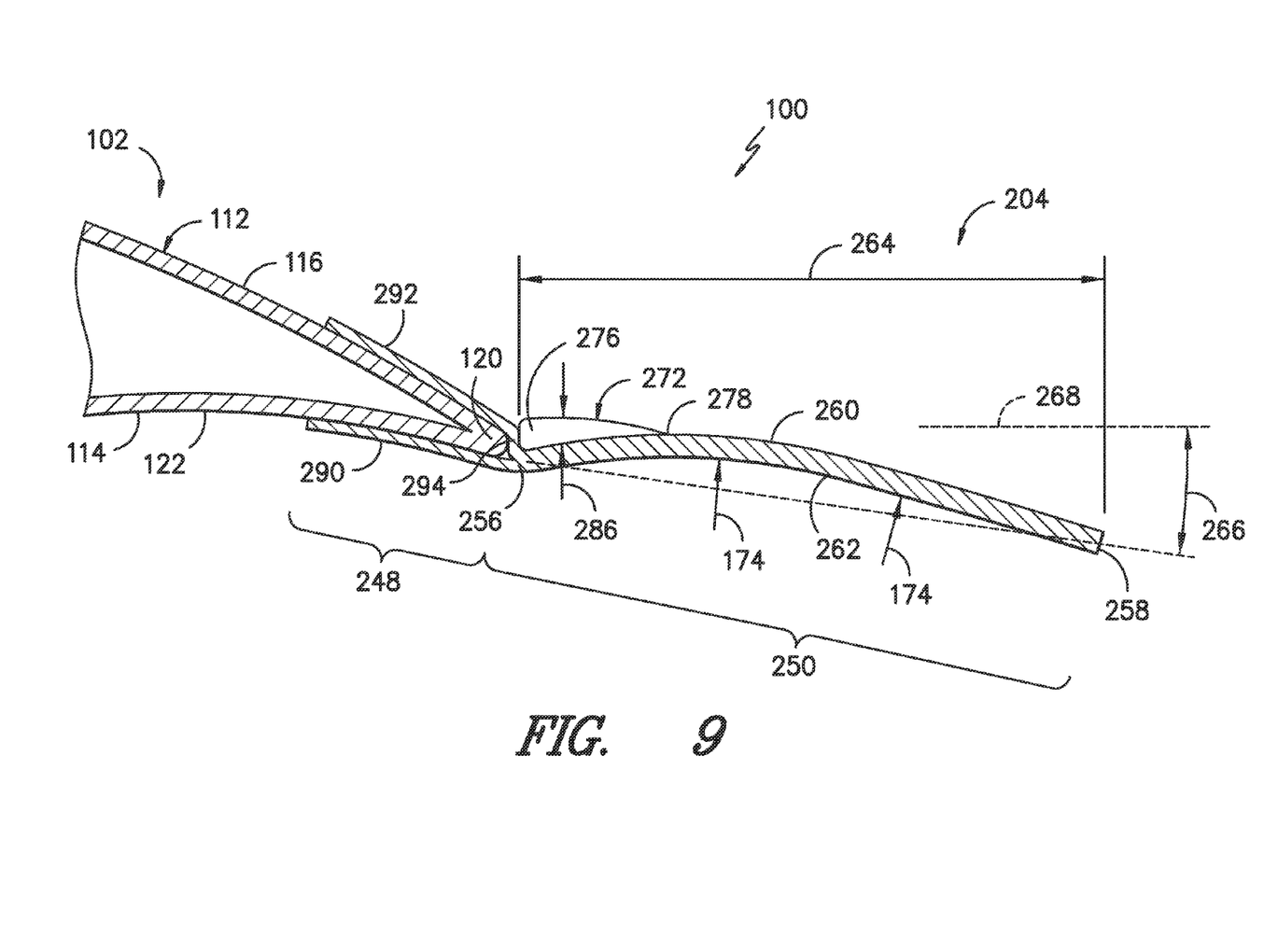
FIG. 9 illustrates a cross-sectional view of the chord extender shown in FIG. 8 coupled to the rotor blade shown in FIG. 2 at its trailing edge.

Referring now to FIGS. 8 and 9, views of another embodiment of a chord extender 204 are illustrated in accordance with aspects of the present subject matter. Specifically, FIG. 8 illustrates a perspective view of the chord extender 204 and FIG. 9 illustrates a cross-sectional view of the chord extender 204 installed onto the rotor blade 102 shown in FIG. 2.

In general, the chord extender 204 may be configured similar to the chord extenders 104, 106 described above with reference to FIGS. 2-7. For example, as shown in FIG. 8, the chord extender 204 may be configured to extend spanwise between an inboard edge 242 and an outboard edge 244 and may generally define any suitable spanwise length 246 between its inboard and outboard edges 242, 244. Additionally, the chord extender 204 may include an attachment portion 248 configured to be coupled to an outer surface 122 of the rotor blade 102 adjacent to the trailing edge 120 and an extension portion 250 extending outwardly from the attachment portion 248 beyond the trailing edge 220.

Similar to the embodiments described above, the extension portion 250 may be configured to extend chordwise between a first end 256 disposed adjacent to the trailing edge 120 of the rotor blade 102 and a second end 258 disposed opposite the first end 256 and may also define an upper surface 260 and a lower surface 262 extending between the first and second ends 256, 258. Additionally, the extension portion 250 may be configured to define any suitable shape or profile between its first and second ends 256, 258, such as by being curved so that its lower surface 262 defines a concave profile (as shown in FIGS. 8 and 9) or a convex profile between the first and second ends 256, 258 or by defining a straight profile between the first and second ends 256, 258. Moreover, the extension portion 250 may generally be configured to define any suitable chordwise length 264 (FIG. 9) between its first and second ends 256, 258 (e.g., a length ranging from about 5% to about 20% of the local chord 126 of the rotor blade 102), which may, for example, vary depending upon the spanwise location at which the chord extender 204 is installed along the blade 102. Further, in several embodiments, the extension portion 250 may be oriented at an angle 266 relative to a reference chord line 268 extending parallel to the chord line 142 (FIG. 2), such as an angle ranging from about 5 degrees to about 30 degrees in the direction of the pressure side 114 of the rotor blade 102.

However, unlike embodiment described above with reference to FIGS. 2-7, the attachment portion 248 of the chord extender 204 is configured to be coupled to the outer surfaces 122 defined by both the pressure and suction sides 114, 115 of the rotor blade 102. Specifically, as shown in FIGS. 8 and 9, the attachment portion 248 defines a forked configuration and includes a first attachment section 290 configured to be coupled along the pressure side 114 of the rotor blade 102 and a second attachment section 292 configured to be coupled along the suction side 116 of the rotor blade 102, with the first and second attachment sections 290, 292 coming together or intersecting directly adjacent to the trailing edge 120 (i.e., at the first end 256 of the extension portion 250). For example, as particularly shown in FIG. 9, the second attachment section 292 may define a stepped profile 294 at the trailing edge 120 such that the second attachment section 202 extends downward adjacent to the trailing edge 120 so as to join the first attachment section 292 at the first end 256 of the extension position 250.

It should be appreciated that, similar to the attachment portion 148 described above, the first and second attachment section 290, 292 may generally be configured to be coupled to the rotor blade 102 along its pressure and suction sides 114, 116 using any suitable attachment means known in the art, such as by using a suitable adhesive(s), mechanical fasteners and/or any other suitable attachment means. It should also be appreciated that, in one embodiment, the chord extender 205 shown in FIGS. 8 and 9 may be formed as a single, integral component. Alternatively, the chord extender 204 may be formed from two or more separate components. For instance, in one embodiment, the first attachment section 290 together with the bottom of the extension portion 250 may be formed together as one component while the second attachment section 292 together with the top of the extension portion 250 may be formed together as a separate component. In such an embodiment, the separate top and bottom components may then be coupled together to form the illustrated chord extender 204.

Additionally, the chord extender 204 may also include one or more ribs 272 configured to provide additional stiffness and rigidity to the extension portion 250. For example, as shown in the illustrated embodiment, the chord extender 204 includes a single stiffening rib 272 projecting outwardly from a surface of the extension portion 250 (e.g., the upper surface 260). However, in other embodiments, the chord extender 204 may include two or more stiffening ribs 272 projecting outwardly from the upper and/or lower surfaces 260, 262 of the extension portion 250.

In general, the stiffening rib 272 may be configured the same as or similar to the stiffening ribs 172 described above. For example, as shown in FIGS. 8 and 9, the stiffening rib 272 may generally be configured to extend chordwise along the top surface 260 of the extension portion 250 between a first rib end 276 and a second rib end 278, with the first rib end 276 being disposed adjacent to the trailing edge 120 of the rotor blade 102. Specifically, as shown in FIG. 9, the stiffening rib 272 may be configured such that its first rib end 276 extends up against or is formed integrally with the stepped profile 284 defined by the second attachment section 292 at the trailing edge 120. As such, when the chord extender 204 is aerodynamically loaded (indicated by arrows 174), a reactive load at the trailing edge 120 may be applied through the stiffening rib 272 to provide rigidity to the extension portion 250.

Additionally, the stiffening rib 272 may be configured to define both a chordwise rib length 282 (FIG. 8) between its first and second ends 278, 280 and a spanwise rib width 284 (FIG. 8) extending transverse to the chordwise rib length 282. As shown in FIG. 8, unlike the embodiment described above, the stiffening rib 272 is configured such that its chordwise rib length 282 is less than its spanwise rib width 272.

Moreover, as particularly shown in FIG. 8, the stiffening rib 272 may be configured to define a height 286 above the surface 260 of the extension portion 250. In several embodiments, the height 286 may be tapered as the stiffening rib 272 extends lengthwise between its first and second ends 276, 278. For example, as shown in the illustrated embodiment, the height 286 is continuously decreased from the first end 276 to the second end 278 of the stiffening rib 272.

It should be appreciated that the various chord extenders 104, 106, 204 of the present subject matter may generally be formed from any suitable material that allows the extenders to function as described herein. For example, in several embodiments, each chord extender 104, 106, 204 may be formed from a relatively stiff or rigid material, such as a fiber-reinforced laminate composite, a polymer material or a metal. However, in other embodiments, the chord extenders 104, 106, 204 may be formed from any other suitable material.

It should also be appreciated that the disclosed chord extenders 104, 106, 204 may also be used in combination with other surface features for the rotor blade 102. For example, in one embodiment, the chord extenders 104, 106, 204 may be used in combination with one or more vortex generators coupled to the outer surface 122 of the rotor blade 102. In addition, such surface features may also be utilized on the chord extenders 104, 106, 204. For example, in one embodiment, surface features, such as vortex generators, may be coupled to and/or formed on the bottom surface 162 or the top surface 160 of the extension portion 150.

Additionally, it should be appreciated that, although the disclosed chord extenders 104, 106, 204 have been described herein as including one or more stiffening ribs 172, 272, the chord extenders 104, 106, 204 may simply include the attachment and extension portions 148, 150, 248, 250 without any stiffening ribs 172, 272. In such an embodiment, the attachment and extension portions 148, 150, 248, 250 may generally be configured the same as or similar to that described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
    a rotor blade extending lengthwise between a root and a tip, the rotor blade including a pressure side and a suction side extending between a leading edge and a trailing edge; and
    a chord extender including an attachment portion coupled to at least one of the pressure side or the suction side and an extension portion extending outwardly from the attachment portion beyond the trailing edge, the extension portion extending in a spanwise direction of the rotor blade between an inboard end and an outboard end opposite the inboard end, the extension portion extending in a chordwise direction of the rotor blade between a first end disposed adjacent to the trailing edge and a second end disposed opposite the first end, the second end of the extension portion being spaced apart from the trailing edge and defining a straight outer edge of the extension portion extending from the inboard end to the outboard end of the extension portion, the extension portion including a surface defined between the first and second ends and the inboard and outboard ends, the extension portion further including at least one stiffening rib projecting outwardly from the surface.

2. The rotor blade assembly of claim 1, wherein the at least one stiffening rib extends lengthwise along the surface of the extension portion between a first rib end and a second rib end, the first rib end being disposed directly adjacent to the trailing edge.

3. The rotor blade assembly of claim 2, wherein, when an aerodynamic load is applied against the extension portion that causes the extension portion to pivot relative to the trailing edge, an end face of the first rib end engages against the trailing edge of the rotor blade.

4. The rotor blade assembly of claim 2, wherein the surface corresponds to an upper surface of the extension portion, the upper surface facing in the substantially same direction as the suction side of the rotor blade.

5. The rotor blade assembly of claim 2, wherein the at least one rib projects outwardly to a height above the surface, the height being tapered as the at least one rib extends lengthwise along the surface between the first and second rib ends in the direction of the second end of the extension portion.

6. The rotor blade assembly of claim 2, wherein a maximum height of the at least one rib is defined at the first rib end.

7. The rotor blade assembly of claim 1, wherein a spanwise width of the at least one rib is greater than a chordwise length of the at least one rib.

8. The rotor blade assembly of claim 1, wherein a spanwise width of the at least one rib is less than a chordwise length of the at least one rib.

9. The rotor blade assembly of claim 1, further comprising a plurality of ribs projecting outwardly from the surface, the plurality of ribs being spaced apart from another along a spanwise length of the extension portion.

10. The rotor blade assembly of claim 1, wherein the attachment portion comprises a first attachment section coupled to the pressure side of the rotor blade and a second attachment section coupled to the suction side of the rotor blade, the first and second attachment sections intersecting at the first end of the extension portion.

11. The rotor blade assembly of claim 1, wherein the extension portion defines a straight profile or a curved profile between the first and second ends.

12. The rotor blade assembly of claim 11, wherein the curved profile corresponds to a concave profile or a convex profile.

13. The rotor blade assembly of claim 1, wherein the extension portion defines a chordwise length between the first and second ends, the chordwise length ranging from about 5% to about 20% of a local chord of the rotor blade defined at the chord extender.

14. The rotor blade assembly of claim 1, wherein the extension portion is oriented at an angle relative to a chord line of the rotor blade ranging from about 5 degrees to about 30 degrees.

15. A chord extender for a rotor blade of a wind turbine, the rotor blade including a pressure side and a suction side extending between a leading edge and a trailing edge, the chord extender comprising:
    an attachment portion configured to be coupled to an outer surface defined by at least one of the pressure side or the suction side of the rotor blade;
    an extension portion configured to extend outwardly from the attachment portion beyond the trailing edge of the rotor blade, the extension portion extending in a spanwise direction of the rotor blade between an inboard end and an outboard end opposite the inboard end, the extension portion extending in a chordwise direction between a first end configured to be disposed adjacent to the trailing edge and a second end disposed opposite the first end, the second end of the extension portion being spaced apart from the trailing edge and defining a straight outer edge of the extension portion extending from the inboard end to the outboard end of the extension portion, the extension portion including a surface defined between the first and second ends and the inboard and outboard ends; and at least one stiffening rib projecting outwardly from the surface of the extension portion, the at least one stiffening rib extending lengthwise along the surface between a first rib end and a second rib end, the first rib end being configured to be disposed adjacent to the first end of the extension portion.

16. The chord extender of claim 15, wherein the surface corresponds to an upper surface of the extension portion, the upper surface facing in the substantially same direction as the suction side of the rotor blade.

17. The chord extender of claim 15, wherein the at least one rib projects outwardly to a height above the surface, the height being tapered as the at least one rib extends lengthwise along the surface between the first and second rib ends in the direction of the second end of the extension portion.

18. The chord extender of claim 15, wherein the extension portion defines a straight profile or a curved profile between the first and second ends.

19. The chord extended of claim 15, wherein the straight outer edge defined by the second end of the extension portion extends generally parallel to the trailing edge of the rotor blade from the inboard end to the outboard end of the extension portion.

20. The rotor blade assembly of claim 1, wherein the straight outer edge defined by the second end of the extension portion extends generally parallel to the trailing edge of the rotor blade from the inboard end to the outboard end of the extension portion.

* * * * *